US011956010B2

United States Patent
Shen et al.

(10) Patent No.: US 11,956,010 B2
(45) Date of Patent: Apr. 9, 2024

(54) REDUCE LINK REPAIR RATE WITH ADDED REDUNDANCY IN PARALLEL OPTICAL LINKS

(71) Applicant: Google LLC, Mountain View, CA (US)

(72) Inventors: Zuowei Shen, Los Altos, CA (US); Biao He, Sunnyvale, CA (US); Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/892,498

(22) Filed: Aug. 22, 2022

(65) Prior Publication Data

US 2023/0283364 A1 Sep. 7, 2023

Related U.S. Application Data

(60) Provisional application No. 63/316,717, filed on Mar. 4, 2022.

(51) Int. Cl.
| | |
|---|---|
| *H04B 10/00* | (2013.01) |
| *H04B 10/038* | (2013.01) |
| *H04B 10/073* | (2013.01) |
| *H04J 14/00* | (2006.01) |

(52) U.S. Cl.
CPC ....... *H04B 10/038* (2013.01); *H04B 10/0731* (2013.01)

(58) Field of Classification Search
CPC .............. H04B 10/032; H04B 10/073
See application file for complete search history.

(56) References Cited

U.S. PATENT DOCUMENTS

| 7,035,540 B2 | 4/2006 | Finan et al. |
| 2006/0056842 A1 | 3/2006 | Li et al. |
| 2017/0019166 A1* | 1/2017 | Yadlowsky ............ H04B 10/03 |

FOREIGN PATENT DOCUMENTS

| EP | 2393229 A1 | 12/2011 |
| JP | 2000069094 A | 3/2000 |
| WO | 0133756 A2 | 5/2001 |
| WO | 2009105281 A2 | 8/2009 |

OTHER PUBLICATIONS

International Search Report and Written Opinion for International Application No. PCT/US2022/041016 dated Dec. 13, 2022. 15 pages.

(Continued)

*Primary Examiner* — Daniel G Dobson
(74) *Attorney, Agent, or Firm* — Lerner David LLP

(57) ABSTRACT

The technology generally relates to determining a status of an optical channel between two components. For example, the components may be connected via an optical link including a plurality of optical channels. A first portion of the optical channels may be in use such that a second portion of the optical channels may be redundant channels. The component may include a test generator that transmits and receives a data pattern over each channel. The test generator may determine, based on the received data pattern, a status of each of the channels. If the status of a given channel is a failure status, the component may divert data for the given channel to a redundant channel.

20 Claims, 4 Drawing Sheets

(56) References Cited

OTHER PUBLICATIONS

Jia, Steve, "Forward Error Correction (FEC): A Primer on the Essential Element for Optical Transmission Interoperability", Apr. 4, 2019, [online] Retrieved from the Interned: >URL:https://www.cablelabs.com/blog/forward-error-correction-fec-a-primer-on-the-essential-element-for-optical-transmission-interoperability>, 17 pages.
Awoyemi, B. S., et al., "Network Restoration for Next-Generation Communication and Computing Networks", Hindawi, Journal of Computer Networks and Communications, Apr. 3, 2018, vol. 2018, Article ID 4134878, 13 pages.
McCoubrey, Andrew, "Adding Redundant Links for High AvailabilityEmbedded Networking", Jan. 31, 2018, [online] Retrieved from the Internet. <URL:https://www.curtisswrightds.com/news/blog/adding-redundant-links-for-high-availability-embedded-networking.html>, 3 pages.
Kim et al., "Addressing node failures in all-optical networks", Apr. 2002, vol. 1, No. 4, Journal of Optical Networking, 10 pages.
"D2D Controller addon for D2D SR112G PHY with CXS interface", [Online] Retrieved from the Internet on Feb. 28, 2022, <URL:https://www.design-reuse.com/sip/d2d-controller-addon-for-d2d-sr112g-phy-with-cxs-interface-ip-49501/ >, 2 pages.
"D2D PHY (Die-to-Die Interface) IP Core ", [online] Retrieved from the Internet on Feb. 28, 2022, <URL:https://www.design-reuse.com/sip/d2d-phy-die-to-die-interface-ip-49414/ >, 2 pages.
Synopsys® Designware IP Datasheet, High-Bandwidth Interconnect PHY, [online] Retrieved from the Internet on Feb. 28, 2022, <URL:https://www.synopsys.com/dw/ipdir.php?ds=dwc_hbi_phy>, 2 pages.
"OpenFive Die-to-Die PHY IP", [online] Retrieved from the Internet on Feb. 28, 2022, <URL:https://openfive.com/die-to-die-ip-subsystem/#> 1 page.

\* cited by examiner

REDUCE LINK REPAIR RATE WITH ADDED REDUNDANCY IN PARALLEL OPTICAL LINKS

CROSS-REFERENCE TO RELATED APPLICATIONS

This application claims the benefit of the filing date of U.S. Provisional Patent Application No. 63/316,717 filed Mar. 4, 2022, the disclosure of which is hereby incorporated herein by reference.

BACKGROUND

Electrical components may be connected via a plurality of links with each link including a plurality of channels. When connected, the electrical links and/or electrical channels may support short distances between the electrical components. For example, the electrical components may only be a few millimeters apart. Due to the high number of electrical links and electrical channels between the electrical components, there may be a high number of redundant electrical channels. Therefore, while there may be redundant channels and/or links that may be used when a respective channel or link fails, the distance between the electrical components limits where the electrical components can be used.

BRIEF SUMMARY

The technology generally relates to determining a status of an optical channel between two components. For example, the components may be connected via an optical link including a plurality of optical channels. A first portion of the optical channels may be in use such that a second portion of the optical channels may be redundant channels and/or redundant lanes. The component may include a test generator that transmits and receives a data pattern over each channel. The test generator may determine, based on the received data pattern, a status of each of the channels. If the status of a given channel is a failure status, the component may divert data for the given channel to a redundant channel.

One aspect of the technology is directed to a component comprising an electrical interface, a test generator, and an optical-electrical converter configured to transmit and receive data via one or more optical channels. The test generator may be configured to determine, based on the data received by the optical-electrical converter, a status of at least one of the optical channels, and when the status for a given optical link is determined to be a failure status, the electrical interface may be configured to divert data for the given optical channel to another optical channel.

The test generator may be further configured to determine, based on data received by the optical-electrical converter, the status of the other channel is a working status. The test generator may be further configured to transmit an electrical data pattern. The optical-electrical converter may be configured to convert the electrical data pattern to an optical data pattern. The optical-electrical converter may be configured to transmit the optical data pattern via the one or more optical channels.

The data received by the optical-electrical converter may be an optical data pattern and the optical-electrical converter may be further configured to convert the received optical data pattern to a received electrical data pattern. The test generator may be further configured to compare the received electrical data pattern to a known data pattern. When the received electrical data pattern is different than the known data pattern the status of the given channel may be the failure status.

Another aspect of the disclosure is directed to a method, comprising: determining, by a test generator based on data received by an optical-electrical converter, a status of at least one optical channel, and diverting, by an electrical interface when the status for a given optical link is determined to be a failure status, data for the given optical channel to another optical channel.

The method may further comprise determining, by the test generator based on data received by the optical-electrical converter, the status of the other channel is a working status. The method may further comprise transmitting, by the test generator, an electrical data pattern. The method may further comprise converting, by the optical-electrical converter, the electrical data pattern to an optical data pattern. The method may further comprise transmitting, by the optical-electrical converter, the optical data pattern via the one or more optical channels.

The data received by the optical-electrical converter may be an optical data pattern. The method may further comprise converting, by the optical-electrical converter, the received optical data pattern to a received electrical data pattern. The method may further comprise comparing, by the test generator, the received electrical data pattern to a known data pattern. When the received electrical data pattern is different than the known data pattern the status of the given channel may be the failure.

Yet another aspect of the disclosure is directed to a system, comprising: a first optical component, a second optical component, and one or more optical links between the first and second components, the optical links comprising a plurality of optical channels, the plurality of optical channels comprising a plurality of active channels and one or more redundant channels. At least of the first or second optical component may be configured to detect when one of the plurality of active channels fails and divert data for the one of the plurality of active channels to one of the one or more redundant channels.

The first or second optical component may be configured to detect that the one of the one or more redundant channels is working prior to diverting the data.

The first optical component may include: a first electrical interface, a first test generator, and a first optical-electrical converter. The second optical component may include: a second electrical interface, a second test generator, and a second optical-electrical converter.

Determining when the active channel fails may include: receiving, by the first or second optical-electrical converter, data via the one of the plurality of active channels, and determining, by the first or second test generator based on the received data, a status of the one of the plurality of active channels is a failure status.

DETAILED DESCRIPTION

Figure 1:
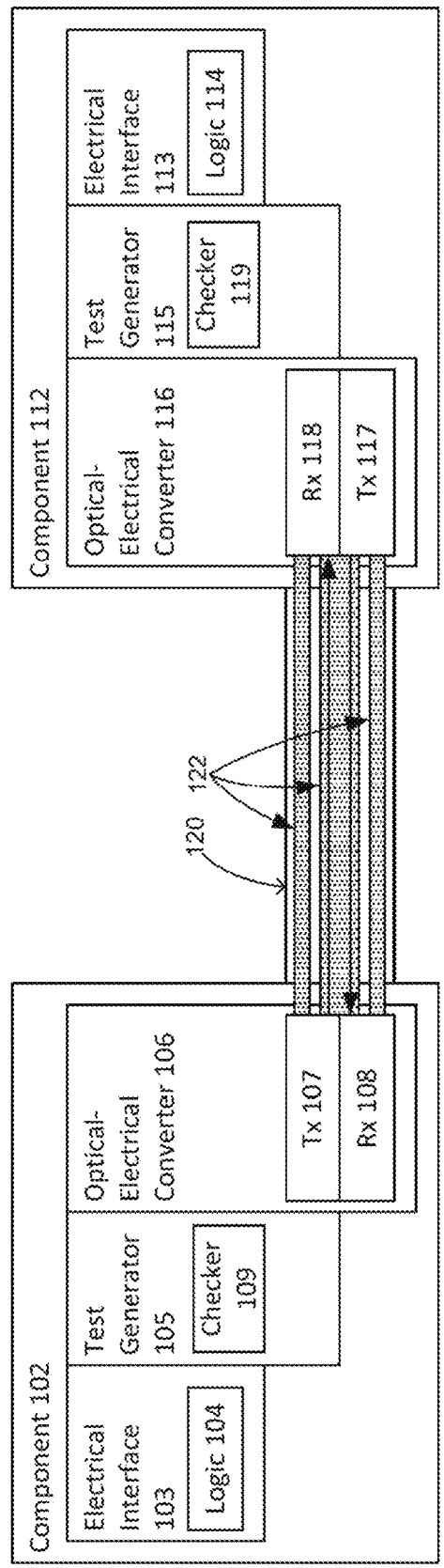
FIG. 1 is a functional diagram of an example system in accordance with aspects of the disclosure.

The technology generally relates to transmission of signals over optical channels, and in particular to providing for diverting signals to redundant channels, or lanes, when failure of an optical channel is detected. For example, the disclosure herein describes determining a status of an optical channel between two components. The status may be, for example, a failure status or a working status. The failure status may occur when the channel does not operate correctly, such as when data fails to transmit accurately on that channel. The working status may occur when the channel is operating correctly, such as when data is successfully transmitted via the channel. In examples where the status of the optical channel is failure status, data intended to be transmitted via that channel may be diverted to an available channel.

According to some examples, the status may be determined by a test generator and checker within a component. For example, the test generator may transmit and/or receive electrical data patterns. The test generator may include a checker that compares a received data pattern to a known data pattern. The known data pattern may be part of a predetermined protocol. In examples where the received data pattern does not match the known data pattern, the test generator may determine that the status of the given optical channel is a failure status. The component may, therefore, divert data intended for transmission over the given optical channel to another optical channel.

According to some examples, the component may determine the status of a given optical channel during the initial link up between two components. The component may be at a lower layer in a data center, such as a physical layer. According to some examples, physical layer may be coupled to an application specific integrated circuit ("ASIC") or system on a chip ("SOC").

In some examples, the component may not require additional software for determining the status of a given optical link. For example, the component and/or internal components may include a predetermined protocol for determining the status of a given optical link. The protocol may, additionally or alternatively, determine how to divert the data for a given optical link to another link. For example, the protocol may include instructions to divert the data for a given optical link with a failure status to an open, or redundant, optical channel with a working status. According to some examples, the protocol may be capable of diverting the data for the given optical link with a failure status to an open, or redundant, optical channel with a working status.

The component may include electrical components, such as an electrical interface, logic, test generator, and checker. The component may include an optical-electrical converter to convert electrical data to optical data before transmitting the data over an optical link. According to some examples, the optical-electrical converter may be an optical chiplet. By using an electrical component and an optical-electrical converter, such as an optical chiplet, the component may include a high number of channels, as compared to a conventional optical interconnect. For example, an electrical component may include thousands of electrical channels whereas a conventional optical interconnect may include a fraction of that, for example eight (8) channels in DR8 transceivers. Thus, optical components may have fewer channels to leave open for redundancy. By using an electrical component with a high number of channels in conjunction with an optical-electrical converter, the component may have a high number of optical channels. This may allow for the component to have more optical channels available as redundant optical channels as compared to an optical component. By having additional optical channels available as redundant optical channels, the component may tolerate a failure rate without having to repair and/or replace the component.

The use of optical channels may allow for a greater reach as compared to electrical components. For example, the reach of electrical components may be a few millimeters whereas the reach between optical components may be up to ten meters or more. By increasing the reach between components, optical connections may be used to support the disaggregation of different resources, such as memory, accelerators, etc.

Example System

FIG. 1 illustrates an example system 100 including two components 102, 112. While two components are illustrated in the example of FIG. 1, it should be understood that other examples may include additional components. Components 102, 112 may be, for example, optical chiplets, parallel optical engines, etc. Electrical interface 103, 113 and test generator 105, 115 may be electrical components. According to some examples, electrical interface 103, 113 and test generator 105, 115 may be, respectively, in a main ASIC and/or a memory. Optical-electrical converter 106, 116 may be, in some examples, a separate optical chip. In some examples, optical electrical converter 106, 116 may be an optical engine and/or an optical chiplet. According to some examples, each component within components 102, 112 may be part of an optical pluggable module. For example, electrical interface 103, 113, test generator 105, 115, and/or optical-electrical converter 106, 116 may each be part of a respective optical pluggable module.

The components 102, 112 may be connected via one or more optical links 120. Each optical link 120 may include one or more optical channels 122. Each optical channel 122 may be configured to transmit and receive information and/or data. While FIG. 1 shows two components 102, 112, a single optical link 120, and three optical channels 122, the system 100 may include two or more components with each component connected to another by one or more optical links including one or more optical channels. Thus, a system 100 with only two components 102, 112 connected via optical link 120 including optical channels 122 is merely an example and is not intended to be limiting.

A first component 102 may include an electrical interface 103, test generator 105, checker 109, optical-electrical converter 106, transmitter 107, and receiver 108. The electrical interface 103 may include logic 104.

The electrical interface 103 may be, for example, a die-to-die ("D2D") physical layer (PHY) circuit. Logic 104 may include, for example, a state machine, logic gates, a truth table, etc. Logic 104 may include one or more redundancy protocols for determining a status of a channel.

Test generator 105 may transmit an electrical data pattern. The electrical data pattern may be used to determine the status of an optical channel. Test generator 105 may, in some examples, include a checker 109. The checker 109 may be, for example, a comparison circuit or software module or other unit configured to compare a received electrical data pattern to a known data pattern identified in the redundancy protocol. If the received electrical data pattern is different than the known data pattern, then checker 109 may determine a failure status for that given optical channel.

Optical-electrical converter 106 may convert the data as received. For example, optical-electric converter 106 may convert electrical signals to optical signals and/or optical signals to electrical signals without performing any correction to the data. In some examples, the optical-electrical converter 106 may not interfere with the initialization protocols when connecting components 102, 112 for the first time. According to some examples, optical-electrical convertor 106 may convert the electrical data pattern from the test generator 105 prior to transmitting the data pattern to the second component 112. Additionally or alternatively, optical-electrical converter 106 may convert an optical data pattern received from the second component 112 into an electrical data pattern.

Optical-electrical converter 106 may include an optical transmitter 107 and optical receiver 108. For example, after optical-electrical converter 106 prepares electrical data for optical transmission, transmitter 107 may transmit an optical signal including the data to a second component 112. Additionally or alternatively, receiver 108 may receive an optical signal including data from the second component 112. The optical-electrical converter 106 may convert the optical data to electrical data before the data goes to the test generator 105 and/or electrical interface 103.

A second component 112 may be similar in structure and function to first component 102 and may include an electrical interface 113 including logic 114, test generator 115, checker 119, optical-electrical converter 116, transmitter 117, and receiver 118.

While each element within components 102, 112 is shown as a separate block, the elements may be combined in a same physical housing or may reside in separate physical housings. Moreover, any element may include a collection or combination of subparts.

As shown in FIG. 1, the first component 102 may include a plurality of optical links 120 connecting first component 102 to second component 112. The optical links 120 may include a plurality of optical channels 122. As shown, first component 102 may be optically coupled to second component 112 via optical link 120. Optical link 120 may include one or more optical channels 122. FIG. 1 illustrates only one optical link 120 and three optical channels 122 for clarity purposes, but it should be understood that any number of optical links and channels may be implemented.

Electrical interface 103 and/or logic 104 may determine and/or identify a number of optical links currently being used to couple first component 102 and second component 112. The number of optical channels currently being used to transmit information between first component 102 and second component 112 may be different from the total number of optical channels between first component 102 and second component 112 in a given optical link 120. For example, some optical channels may be reserved for redundancy. The number of reserved channels may be based on the number of channels in use. By way of example only, 2%, 5%, 10% or any other percentage of the total number of channels may be reserved for redundancy while the rest are used for transmission of optical signals. Just as one example, there may be one hundred (100) optical channels 122 in optical link 120 between first component 102 and second component 112. Of the one hundred (100) optical channels 122, only ninety-five (95) of the optical channels 122 may be in active use to send information between first component 102 and second component 112. Thus, there may be five (5) redundant, or available, optical channels 122 in optical link 120.

The redundant links may be used to send optical signals when one or more active channels fail. For example, if a failure is detected in active optical link A, data intended for transmission over optical link A may be diverted to one or more of the redundant links for transmission. Such diversion may be performed using, for example, electrical interface 103 and/or logic 104.

According to some examples, it may first be confirmed that the redundant link has a working status prior to diverting the data from the failed active link. A working status may be when the link is operating correctly such that data may be transmitted between first component 102 and second component 112. A failure status may be when the link cannot properly transmit data between first component 102 and second component 112.

To determine the status of the link, test generator 105 may generate and transmit an electrical data pattern. The electrical data pattern may be, for example, a Reed-Solomon ("RS") code, a random pattern, a pseudo random pattern, etc. The electrical data pattern may be, in some examples, part of a predetermined protocol. The test generator 105 may be pre-programmed to include the protocol.

The optical-electrical converter 106 may receive the electrical data pattern and convert the electrical data pattern to an optical data pattern to be transmitted via optical link 120 to the second component 112. The optical-electric convertor 106 may, in some examples, be a transparent converter. For example, optical-electrical convertor 106 may convert electrical data to optical data and/or optical data to electrical data without performing any corrections to the data.

For example, transmitter 107 may transmit the optical data pattern via link 120 to be received by receiver 118 of optical-electrical converter 116 of the second component 112. The second component 112 may have elements similar to first component 102, including optical-electrical converter 116, transmitter 117, receiver 118, test generator 115, electrical interface 113, and logic 114.

The optical-electrical converter 116 of the second component 112 may convert the received optical data pattern to an electrical data pattern. Checker 119 may check the received data pattern to determine whether the received data pattern corresponds to the data pattern transmitted by component 102. For example, checker 119 may be pre-programmed with a protocol including a known data pattern. Checker 119 may compare the received data pattern to the known data pattern. For example, if test generators 105, 115 are configured to transmit an RS code, checker 119 may compare the received data pattern to the known RS code. If the checker identifies a difference between the received data pattern and the known data pattern, checker 119 may determine that the status of the optical channel is a failure status.

According to some examples, test generator 115 may retransmit the received data pattern regardless of whether the data pattern matches the known data pattern. For example, optical-electrical converter 116 may convert the received electrical data pattern to an optical data pattern for transmission back to the first component 102. Thus, the data pattern may be transmitted in a loop between test generator 105 of first component 102 and test generator 115 of second component 112.

In examples where the received data pattern does not match the known data pattern, either or both component 102, 112 may divert the data for the given channel to another working channel.

According to some examples, first component 102 may be an anchor component 102. An anchor component may be, for example, a component that initiates the connection between the components. Thus, the anchor component may be the component that is the first to transmit the data pattern. The anchor component, e.g. first component 102 in this example, may be responsible for diverting the data from a channel with a failure status to another channel. In some examples, the test generator 105, 115 may determine that the other channel has a status of a working channel.

Diverting the data for a given optical channel with a failure status to another optical channel having a working status may result in less downtime for communication between the optical components. For example, electrical interface 103, 113 and/or logic 104/114 may divert the data from the given channel to another channel in real-time and/or substantially real-time such that data is not lost and/or delayed. Moreover, diverting the data for the given optical channel to another optical channel does not require any repair to the optical interconnect. Thus, there may not be a need to replace component 102, 112 and/or any internal components until there are no additional redundant lanes available.

According to some examples, when checker 119 determines that the data pattern received by component 112 matches the data pattern transmitted by component 102, electrical interface 113 and/or logic 114 may determine the status of link 120 is a working status. That is, when the transmitted data pattern matches the received data pattern, optical link 120 is not damaged such that data transmitted via optical link 120 is not missing, damaged, corrupted, etc.

Figure 2A:
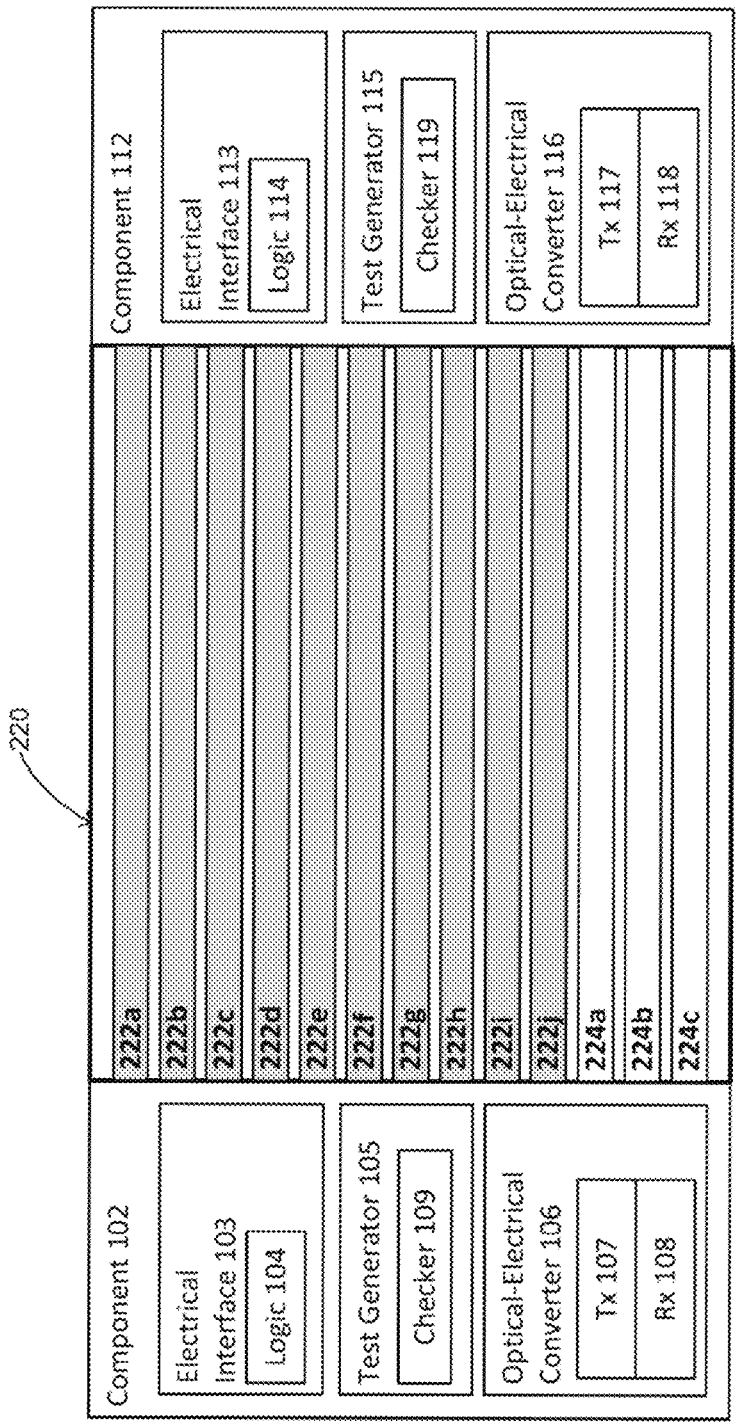
FIGS. 2A and 2B are functional diagrams of an example system in accordance with aspects of the disclosure.
Figure 2B:
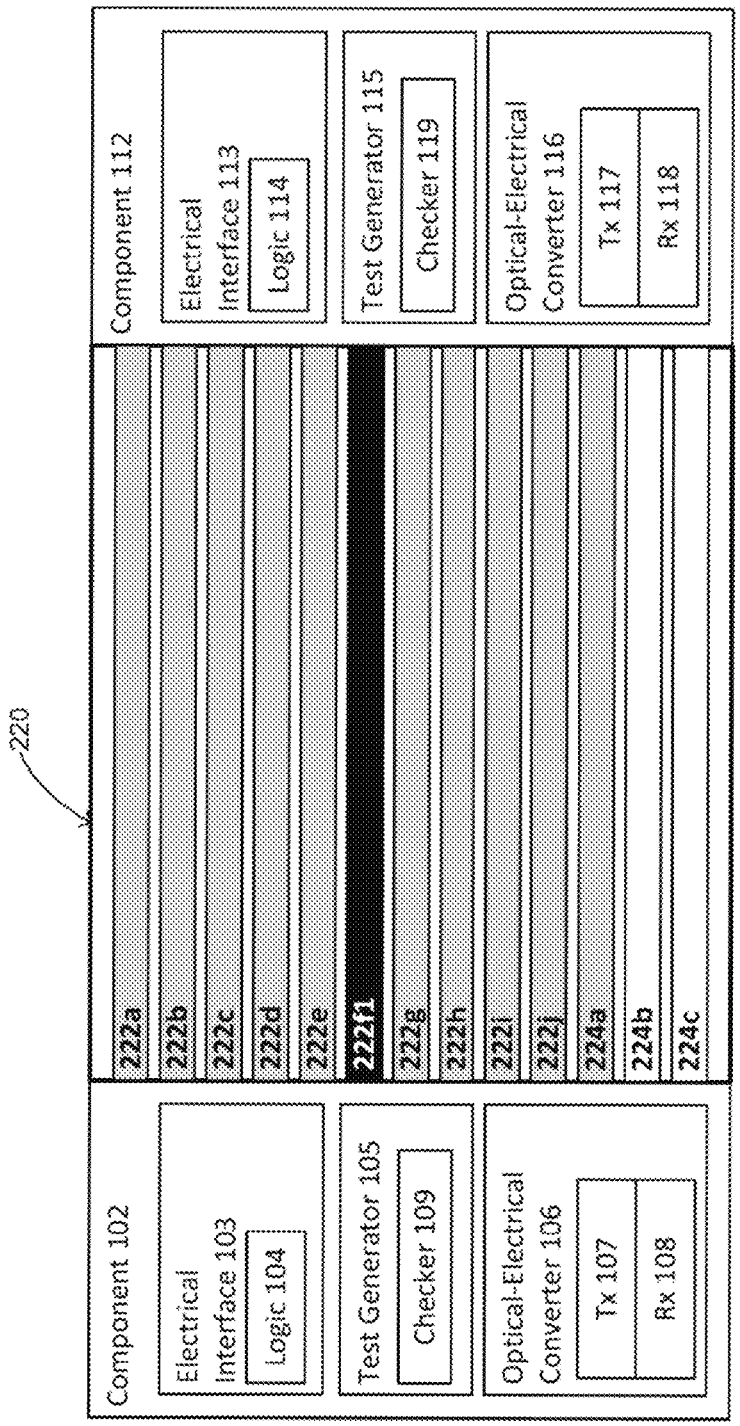

FIGS. 2A and 2B illustrate an example system with a plurality of optical channels within an optical link between two components. The system 200 may include first component 102 and second component 112 including an electrical interface 103, 113, logic 104, 114, test generator 105, 115, checker 109, 119, optical-electrical converter 106, 116, optical transmitter 107, 117, and optical receiver 108, 118. First component 102 and second component 112 and their internal components may be similar to those described above with respect to FIG. 1.

First component 102 may be optically connected to second component 112 via one or more optical links 220. While only one optical link 220 is shown, there may be any number of optical links. Optical link 220 may include a plurality of optical channels 222a-f, 224a-c. Optical channels 222a-f may be used at a given time to send data between component 102 and component 112. Optical channels 224a-c may be open, or redundant channels, at the given time. When any of the optical channels 222a-f fails, data may be diverted from the failed channel to one of open optical channels 224a-c.

In some examples, test generator 105, 115 may transmit a data pattern over optical channels 222a-f to test the status of each of optical channels 222a-f. For example, test generator 105 may transmit an electrical data pattern. Optical-electrical converter 106 may convert the electrical data pattern to an optical data pattern. Transmitter 107 may then transmit the optical data pattern to component 112 over each of optical channels 222a-f, 224a-c.

Receiver 118 of component 112 may receive the optical data pattern. Optical-electrical converter 116 may convert the optical data pattern to an electrical data pattern. Checker 119 may then compare the electrical data pattern to a known data pattern prior to test generator retransmitting the electrical data pattern back to component 102. In some examples, when checker 119 determines the electrical data pattern does not match the known data pattern for a given channel, checker 119 may determine that a status of that optical channel is a failure status. For example, as shown in FIG. 2B, the status of optical channel 222f/1 may be a failure status. That is, checker 119 may have determined that the data pattern received on optical channel 222f does not match the known data pattern.

In some examples, electrical interface 113 and/or logic 114 may, based on the failure status of optical channel 222f/1, divert the data for optical channel 222f/1 to an open, or redundant, optical channel 224a. Additionally or alternatively, electrical interface 103 and/or logic 104 may divert the data for optical channel 222f/11 to an open optical channel 224a after receiving the incorrect data pattern. For example, test generator 115 may retransmit the incorrect data pattern to component 102. In such an example, the incorrect electrical data pattern may be converted to an optical data pattern by optical-electrical converter 116 prior to transmission to component 102. Receiver 108 may receive the optical data pattern and optical-electrical converter 106 may convert the optical data pattern to an electrical data pattern. Checker 109 may determine that the received data pattern does not correspond to the known data pattern of the redundancy protocol. Checker 109 may, therefore, determine and/or confirm the status of optical channel 222f/1 as a failure status. Electrical interface 103 and/or logic 104 may, then, divert the data for optical channel 222f/1 to optical channel 224a.

After the data for optical channel 222f/1 is diverted to optical channel 224a, additional open optical channels 224b, 224c may remain. If checker 109, 119 determines the status of any of optical channels 222a-e, 222f-j to be a failure status, the data for that given channel may be diverted to open optical channel 224b, 224c. In some examples, electrical interface 103, 113 and/or logic 104, 114 may only divert the data for a given channel to open optical channel 224b, 224c is checker 109, 119 has determined the status of optical channel 224b, 224c to be a working status.

Example Methods

Figure 3:
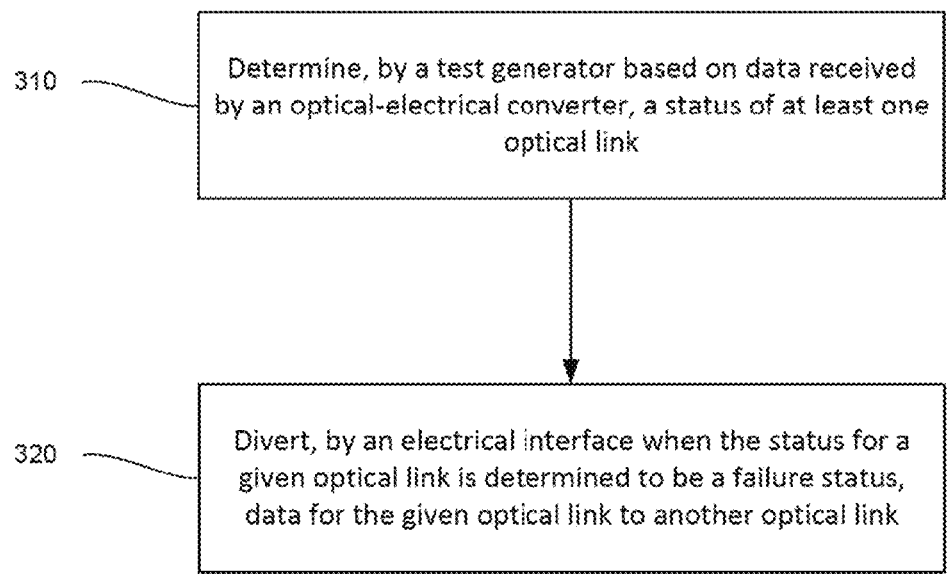
FIG. 3 is flow diagram illustrating an example method in accordance with aspects of the disclosure

FIG. 3 illustrates an example method of diverting data to another optical channel based on a failure status of a given optical channel. The following operations do not have to be performed in the precise order described below. Rather, various operations can be handled in a different order or simultaneously, and operations may be added or omitted.

In block 310, a test generator may determine, based on data received by an optical-electrical converter, a status of at least one optical link.

For example, a component may include an electrical interface, test generator, and optical-electrical converter. The optical-electrical converter may transmit and/or receive optical data. In some examples, the optical-electrical converter may include a transmitter and/or receiver. The optical data may be, for example, an optical data pattern. The optical-electrical converter may convert the optical data pattern to an electrical data pattern. The test generator may compare the received electrical pattern to a known electrical data pattern. For example, the test generator may be pre-programed to include one or more known electrical data patterns. The known electrical data patterns may, for example, the electrical data pattern that the test generator may transmit to another component.

To determine the status of the at least one optical link, the test generator may compare the received data to known data. According to some examples, the test generator may include a checker such that the checker compares the received data to known data. The data may be an electrical data pattern such that the test generator compares the received electrical data pattern to a known electrical data pattern. If the received data pattern matches the known electrical data pattern, the test generator may determine the status of a given optical channel is a working status. If the received data pattern does not match the known electrical data pattern, the test generator may determine the status of a given optical channel is a failure status.

In block 320, the electrical interface may divert data for a given optical link to another optical link when the status for the given optical link is determined to be a failure status. For example, the test generator may determine, based on data received by the optical-electrical converter, that the status of the other link is a working status. The electrical interface may, therefore, divert the data for the given optical link to an optical link that has a working status. This may reduce the downtime for the data to be transmitted. Additionally or alternatively, as the optical link between two components may include a plurality of open, or redundant optical channels, diverting the data for a given optical link to an open optical link may prevent the need to repair the component as using an open optical link does not reduce the bandwidth and/or transmission for any of the other optical links.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A component, comprising:
an electrical interface configured to determine a subset of a plurality of optical channels actively being used to transmit or receive data;
a test generator; and
an optical-electrical converter configured to transmit and receive the data via the subset of the plurality of optical channels,
wherein the test generator is configured to determine, based on the data received by the optical-electrical converter, a status of at least one optical channel of the subset of the plurality of optical channels, and
wherein when the status for the at least one optical channel is determined to be a failure status, the electrical interface is configured to divert data for the at least one optical channel to another optical channel not included within the subset of the plurality of optical channels.

2. The component of claim 1, wherein the test generator is further configured to determine, based on data received by the optical-electrical converter, the status of the other optical channel is a working status.

3. The component of claim 1, wherein the test generator is further configured to transmit an electrical data pattern.

4. The component of claim 3, wherein the optical-electrical converter is configured to convert the electrical data pattern to an optical data pattern.

5. The component of claim 4, wherein the optical-electrical converter is configured to transmit the optical data pattern via the plurality of optical channels.

6. The component of claim 1, wherein:
the data received by the optical-electrical converter is an optical data pattern, and
the optical-electrical converter is further configured to convert the received optical data pattern to a received electrical data pattern.

7. The component of claim 6, wherein the test generator is further configured to compare the received electrical data pattern to a known data pattern.

8. The component of claim 7, wherein when the received electrical data pattern is different than the known data pattern the status of the given channel is the failure status.

9. A method, comprising:
determining, by an electrical interface, a subset of a plurality of optical channels actively being used to transmit or receive data;
determining, by a test generator based on data received by an optical-electrical converter, a status of at least one optical channel of the subset of the plurality of optical channels; and
diverting, by an electrical interface when the status for the at least one optical channel is determined to be a failure status, data for the at least one optical channel of the subset to another optical channel not included within the subset of the plurality of optical channels.

10. The method of claim 9, further comprising determining, by the test generator based on the data received by the optical-electrical converter, the status of the other optical channel is a working status.

11. The method of claim 9, further comprising transmitting, by the test generator, an electrical data pattern.

12. The method of claim 11, further comprising converting, by the optical-electrical converter, the electrical data pattern to an optical data pattern.

13. The method of claim 12, further comprising transmitting, by the optical-electrical converter, the optical data pattern via the plurality of optical channels.

14. The method of claim 9, wherein the data received by the optical-electrical converter is an optical data pattern, and wherein the method further comprises converting, by the optical-electrical converter, the received optical data pattern to a received electrical data pattern.

15. The method of claim 14, further comprising comparing, by the test generator, the received electrical data pattern to a known data pattern.

16. The method of claim 15, wherein when the received electrical data pattern is different than the known data pattern the status of the given channel is the failure status.

17. A system, comprising:
a first optical component;
a second optical component; and
one or more optical links between the first and second optical components, the optical links comprising a plurality of optical channels, the plurality of optical channels comprising a plurality of active channels and one or more redundant channels,
wherein at least one of the first or second optical component includes an electrical interface configured to determine the plurality of active channels being used to transmit or receive data between the first and second optical components, and
wherein at least of the first or second optical component are configured to detect when one of the plurality of active channels fails and divert data for the one of the plurality of active channels to one of the one or more redundant channels.

18. The system of claim 17, wherein the first or second optical component are configured to detect that the one of the one or more redundant channels is working prior to diverting the data.

19. The system of claim 17, wherein
the first optical component includes:
a first electrical interface;
a first test generator; and
a first optical-electrical converter; and
the second optical component includes:

a second electrical interface;

a second test generator; and a second optical-electrical converter.

20. The system of claim 19, wherein determining when the active channel fails includes:

receiving, by the first or second optical-electrical converter, data via the one of the plurality of active channels; and determining, by the first or second test generator based on the received data, a status of the one of the plurality of active channels is a failure status.

* * * * *